United States Patent
Shindo

(10) Patent No.: US 11,677,262 B2
(45) Date of Patent: Jun. 13, 2023

(54) IN-VEHICLE BACKUP CONTROL APPARATUS AND IN-VEHICLE BACKUP APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hao Shindo, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/549,755

(22) Filed: Dec. 13, 2021

(65) Prior Publication Data

US 2022/0103007 A1 Mar. 31, 2022

(30) Foreign Application Priority Data

Dec. 14, 2020 (JP) .............................. JP2020-206602

(51) Int. Cl.
*H02J 9/06* (2006.01)
*H02J 7/00* (2006.01)
*B60R 16/033* (2006.01)
*B60L 53/62* (2019.01)

(52) U.S. Cl.
CPC ................ *H02J 9/06* (2013.01); *B60L 53/62* (2019.02); *B60R 16/033* (2013.01); *H02J 7/0063* (2013.01); *H02J 7/007182* (2020.01)

(58) Field of Classification Search
CPC ...... H02J 9/06; H02J 7/007182; H02J 7/0063; B60L 53/62; B60R 16/033
USPC ................................................. 307/64, 10.1
See application file for complete search history.

(56) References Cited

U.S. PATENT DOCUMENTS

2021/0167626 A1* 6/2021 Chiang .................. H02H 3/243
2021/0242712 A1* 8/2021 Izawa ..................... H02J 9/061

FOREIGN PATENT DOCUMENTS

JP 2009-296808 A 12/2009

* cited by examiner

*Primary Examiner* — Michael R. Fin
(74) *Attorney, Agent, or Firm* — Honigman LLP

(57) ABSTRACT

An in-vehicle backup the control apparatus includes a switch unit (for example, including second switch units), a control unit, a low-voltage detection circuit, and a latching circuit. The switch unit is provided between a power storage unit and a load (for example, a second load). The control unit controls the switch unit. The low-voltage detection circuit detects a low-voltage state of an electric power path through which electric power from a power supply unit is supplied. When the low-voltage detection circuit detects the low-voltage state, the latching circuit is switched to a latched state in which the switch unit is kept in an on state. When the electric power path is in the low-voltage state, the control unit releases the latched state and controls the switch unit to be in an on state.

3 Claims, 3 Drawing Sheets

IN-VEHICLE BACKUP CONTROL APPARATUS AND IN-VEHICLE BACKUP APPARATUS

CROSS-REFERENCE TO RELATED APPLICATIONS

This application claims priority of Japanese Patent Application No. JP 2020-206602 filed on Dec. 14, 2020, the contents of which are incorporated herein.

TECHNICAL FIELD

The present disclosure relates to an in-vehicle backup control apparatus and an in-vehicle backup apparatus.

BACKGROUND

JP 2009-296808A discloses a power storage apparatus that supplies electric power from a power storage unit to a load when the voltage of a main power supply is low. A control circuit included in the power storage apparatus controls a charging circuit when the main power supply is in normal operation, and thereby charges the power storage unit. Then, when the voltage of the main power supply is low (for example, when the engine is activated after a start-stop operation), the control circuit turns on a switch provided between the power storage unit and the load, and supplies electric power to the load. JP 2009-296808A also discloses that the power storage apparatus is also applicable to a power supply backup system used when the main power supply is in an abnormal state.

JP 2009-296808A is an example of related art.

There are backup target loads that are desirably backed up rapidly. However, in the power storage apparatus disclosed in JP 2009-296808A, the control circuit periodically determines whether or not the main power supply is in an abnormal state, without compromising other processing. Accordingly, there is a limit to shortening the time period from when the main power supply enters an abnormal state to when the switch is turned on.

Accordingly, it is an object of the present disclosure to provide a technique with which a backup can be performed more rapidly when the power supply is in an abnormal state.

SUMMARY

An in-vehicle backup control apparatus according to the present disclosure is an in-vehicle backup control apparatus to be used in an in-vehicle power supply system including a power supply unit, a power storage unit, and a load, the in-vehicle backup control apparatus being configured to perform a backup operation of supplying electric power from the power storage unit to the load when an electric power path through which electric power from the power supply unit is supplied is in a low-voltage state, the in-vehicle backup control apparatus including: a switch unit disposed between the power storage unit and the load; a control unit that controls the switch unit; a low-voltage detection circuit that detects the low-voltage state; and a latching circuit that is switched to a latched state in which the switch unit is kept in an on state when the low-voltage detection circuit detects the low-voltage state, wherein the control unit controls the switch unit to be in the on state when the electric power path is in the low-voltage state.

An in-vehicle backup apparatus according to the present disclosure includes: the in-vehicle backup control apparatus of the present disclosure; and the power storage unit.

According to the present disclosure, a backup can be performed more rapidly when the power supply is in an abnormal state.

DETAILED DESCRIPTION OF PREFERRED EMBODIMENTS

Figure 1:
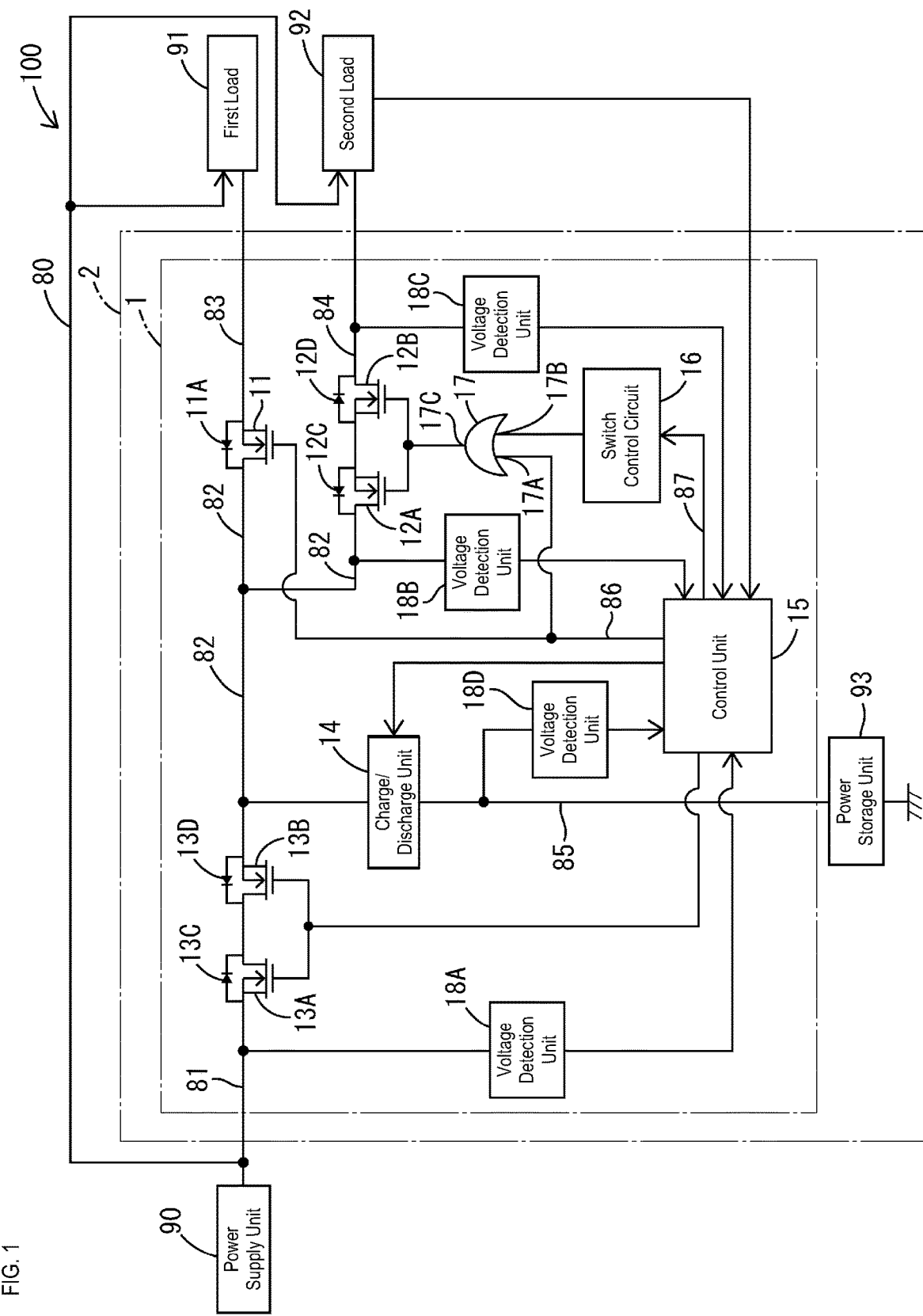
FIG. 1 is a circuit diagram schematically showing a configuration of an in-vehicle power supply system according to a first embodiment of the present disclosure.

First, embodiments of the present disclosure are listed and described.

In a first aspect an in-vehicle backup control apparatus is provided. The in-vehicle backup control apparatus is to be used in an in-vehicle power supply system including a power supply unit, a power storage unit, and a load, the in-vehicle backup control apparatus being configured to perform a backup operation of supplying electric power from the power storage unit to the load when an electric power path through which electric power from the power supply unit is supplied is in a low-voltage state, the in-vehicle backup control apparatus including: a switch unit disposed between the power storage unit and the load; a control unit that controls the switch unit; a low-voltage detection circuit that detects the low-voltage state; and a latching circuit that is switched to a latched state in which the switch unit is kept in an on state when the low-voltage detection circuit detects the low-voltage state, wherein the control unit controls the switch unit to be in the on state when the electric power path is in the low-voltage state.

With this configuration, when the electric power path is in the low-voltage state, the latching circuit can be instantly switched to the latched state to switch the switch unit to an on state and supply electric power to the load. Accordingly, electric power can be instantly supplied to the load, without having to wait for the switch unit to be in an on state by the control unit performing periodical processing.

In a second aspect, the in-vehicle backup control apparatus according to the first aspect, the control unit releases the latched state and controls the switch unit to be in an off state when the electric power path is not in the low-voltage state.

With this configuration, even when the latching circuit is switched to the latched state due to an operational error or due to the electric power path being temporarily in the low-voltage state, the control unit can release the latched state and turn the switch unit back to an off state.

In the third aspect, the in-vehicle backup control apparatus according to the first aspect or the second aspect, the low-voltage detection circuit is configured to receive an input of a low voltage signal when the electric power path is in the low-voltage state, the in-vehicle backup control apparatus includes a failure check circuit that provides the low voltage signal to the low-voltage detection circuit as a check signal, and the control unit causes the failure check circuit to perform an operation of providing the check signal to the low-voltage detection circuit, and performs failure check processing of determining whether or not the latching circuit is in the latched state.

With this configuration, it is possible to check whether or not the low-voltage detection circuit and the latching circuit normally operate.

In a fourth aspect, the in-vehicle backup control apparatus according to the third aspect, further includes a charge unit that performs a charge operation of charging the power storage unit, wherein the control unit performs charge control of causing the charge unit to perform the charge operation until the charge voltage of the power storage unit reaches a target voltage when a vehicle starts operating, and performs the failure check processing before the charge control is started after the vehicle starts operating, or in parallel to the charge control.

With this configuration, the failure check processing can be performed rapidly after the vehicle starts operating.

First Embodiment

Configuration of In-Vehicle Power Supply System

An in-vehicle power supply system 100 shown in FIG. 1 includes a power supply unit 90, a first load 91, a second load 92, a power storage unit 93, and an in-vehicle backup control apparatus 1 (hereinafter also referred to as "control apparatus 1"). An in-vehicle backup apparatus 2 shown in FIG. 1 includes the control apparatus 1 and the power storage unit 93. The power supply unit 90 is electrically connected to the first load 91 and the second load 92 via an electric power path 80. Electric power from the power supply unit 90 is supplied to the first load 91 and the second load 92 via the electric power path 80. The control apparatus 1 performs a backup operation of supplying electric power from the power storage unit 93 to the first load 91 and the second load 92 when the electric power path 80 is in the low-voltage state. As used herein, the term "low-voltage state" refers to, for example, a state in which the voltage of the electric power path 80 is less than or equal to a threshold value.

The power supply unit 90 functions as a main power supply. The power supply unit 90 is a DC power supply that generates a DC voltage, and may be, for example, a lead battery. A high-potential terminal of the power supply unit 90 is electrically connected to the electric power path 80 and a first conductive path 81, and a low-potential terminal of the power supply unit 90 is electrically connected to, for example, the ground. The power supply unit 90 is configured to apply a predetermined output voltage to the first conductive path 81.

The first load 91 is an electric component that has a lower degree of backup urgency than the second load 92, and may be, for example, an in-vehicle actuator such as a motor. The first load 91 may be composed of only one load or a plurality of loads. In the present embodiment, the first load 91 is configured to receive a supply of electric power from the power supply unit 90 while the electric power path 80 is not in the low-voltage state, but may be configured to not receive the supply of electric power.

The second load 92 corresponds to "load", and is an electric component that has a higher degree of backup urgency than the first load 91, and may be, for example, an ECU or an actuator in an electric parking braking system, an ECU or an actuator in a shift-by-wire control system, or the like. The second load 92 may be composed of only one load or a plurality of loads. In the present embodiment, the second load 92 is configured to receive a supply of electric power from the power supply unit 90 while the electric power path 80 is not in the low-voltage state, but may be configured to not receive the supply of electric power.

The power storage unit 93 functions as an auxiliary power supply. The power storage unit 93 is a DC power supply that outputs a DC voltage, and may be, for example, an electric double-layer capacitor. The power storage unit 93 is electrically connected to a charge/discharge unit 14 via a fifth conductive path 85, and performs charging and discharging via the charge/discharge unit 14. The output voltage of the power storage unit 93 is kept at a voltage lower than or equal to a standby voltage while the vehicle is stopping, and the power storage unit 93 is charged until the output voltage reaches a voltage higher than or equal to a target voltage that is higher than the standby voltage when the vehicle starts operating, and is discharged until the output voltage reaches a voltage less than or equal to the standby voltage when the vehicle stops.

The control apparatus 1 includes a first conductive path 81, a second conductive path 82, a third conductive path 83, a fourth conductive path 84, a fifth conductive path 85, a first switch unit 11, second switch units 12A and 12B, third switch units 13A and 13B, a charge/discharge unit 14, a control unit 15, a switch control circuit 16, an OR circuit 17, and voltage detection units 18A, 18B, 18C, and 18D.

The first conductive path 81 is electrically connected to the high-potential terminal of the power supply unit 90 and is also electrically connected to the electric power path 80. The voltage of the first conductive path 81 is reflected by the voltage of the electric power path 80. For example, the voltage of the first conductive path 81 is greater than the threshold value unless the electric power path 80 is in the low-voltage state, and is less than or equal to the threshold value when the electric power path 80 is in the low-voltage state. The second conductive path 82 is disposed at a position closer to the first load 91 and the second load 92 rather than the first conductive path 81, and branched into paths respectively connected to the first load 91 and the second load 92. The third conductive path 83 is electrically connected to the first load 91, and is also electrically connected to the electric power path 80. The fourth conductive path 84 is electrically connected to the second load 92. The fifth conductive path 85 is electrically connected to the charge/discharge unit 14 and the power storage unit 93.

The first switch unit 11, the second switch units 12A and 12B, and the third switch units 13A and 13B are configured as, for example, switching elements, and more specifically, as N-channel MOSFETs (Metal-Oxide-Semiconductor Field Effect Transistors). The first switch unit 11, the second switch units 12A and 12B, and the third switch units 13A and 13B are controlled to be in an on state when an on signal is received from the control unit 15, and controlled to be in an off state when an off signal is received from the control unit 15.

The first switch unit 11 is disposed between the power storage unit 93 and the first load 91, and is disposed between the second conductive path 82 and the third conductive path 83. The first switch unit 11 includes a parasitic diode 11A. The anode of the parasitic diode 11A is electrically connected to the third conductive path 83, and the cathode of the parasitic diode 11A is electrically connected to the second conductive path 82. When the first switch unit 11 is switched to an on state, a supply of electric power from the second conductive path 82 side to the third conductive path 83 side is allowed. When the first switch unit 11 is switched to an off state, the supply of electric power from the second conductive path 82 side to the third conductive path 83 side is prohibited.

The second switch units 12A and 12B correspond to "switch unit", and are disposed between the power storage unit 93 and the second load 92 and are disposed between the second conductive path 82 and the fourth conductive path 84. The second switch units 12A and 12B include parasitic diodes 12C and 12D, respectively. The second switch units 12A and 12B are connected to each other in series, and are inversely connected to each other. When the second switch units 12A and 12B are switched to an on state, a supply of electric power from the second conductive path 82 side to the fourth conductive path 84 side is allowed. When the second switch units 12A and 12B are switched to an off state, the supply of electric power from the second conductive path 82 side to the fourth conductive path 84 side is prohibited.

The third switch units 13A and 13B are disposed between the power supply unit 90 and the power storage unit 93, and are disposed between the first conductive path 81 and the second conductive path 82. The third switch units 13A and 13B include parasitic diodes 13C and 13D, respectively. The third switch units 13A and 13B are connected to each other in series, and are inversely connected to each other. When the third switch units 13A and 13B are switched to an on state, a supply of electric power from the first conductive path 81 side to the second conductive path 82 side is allowed. When the third switch units 13A and 13B are switched to an off state, the supply of electric power from the first conductive path 81 side the second conductive path 82 side is prohibited.

The charge/discharge unit 14 corresponds to "charge unit", and is configured as, for example, a voltage conversion circuit such as a DC/DC converter. The charge/discharge unit 14 is disposed between the second conductive path 82 and the fifth conductive path 85. The charge/discharge unit 14 performs a charge operation and a discharge operation for the power storage unit 93. As the charge operation, the charge/discharge unit 14 performs an operation of allowing the power storage unit 93 to be charged. More specifically, as the charge operation, the charge/discharge unit 14 performs an operation of stepping up or down a voltage applied to the second conductive path 82 and applying the voltage to the fifth conductive path 85. As the discharge operation, the charge/discharge unit 14 performs an operation of allowing the power storage unit 93 to be discharged. More specifically, as the discharge operation, the charge/discharge unit 14 performs an operation of stepping up or down a voltage applied to the fifth conductive path 85 and applying the voltage to the second conductive path 82. The charge/discharge unit 14 performs the charge operation when the third switch units 13A and 13B are in an on state, and thereby charges the power storage unit 93. The charge/discharge unit 14 performs the discharge operation when the first switch unit 11 and the second switch units 12A and 12B are in an on state, and thereby discharges the power storage unit 93, as a result of which, electric power can be supplied to the first load 91 and the second load 92.

The voltage detection units 18A, 18B, 18C, and 18D are configured as, for example, voltage detection circuits. The voltage detection unit 18A detects the voltage of the first conductive path 81. The voltage detection unit 18B detects the second conductive path 82. The voltage detection unit 18C detects the voltage of the fourth conductive path 84. The voltages of the second switch units 12A and 12B are detected by the voltage detection units 18B and 18C, respectively. The voltage detection unit 18D detects the voltage of the fifth conductive path 85, or in other words, the charge voltage of the power storage unit 93.

The control unit 15 is composed mainly of, for example, a microcomputer, and includes a computation apparatus such as a CPU (Central Processing Unit), a memory such as a ROM (Read Only Memory) or a RAM (Random Access Memory), an A/D converter, and the like.

The control unit 15 is electrically connected to the voltage detection units 18A, 18B, 18C, and 18D. The control unit 15 can acquire the voltage applied to the first conductive path 81, the voltages of the second switch units 12A and 12B, and the charge voltage of the power storage unit 93 based on signals from the voltage detection units 18A, 18B, 18C, and 18D. The control unit 15 determines that the electric power path 80 is not in the low-voltage state when the voltage of the first conductive path 81 is greater than a threshold value, and determines that the electric power path 80 is in the low-voltage state when the voltage of the first conductive path 81 is less than or equal to the threshold value.

The control unit 15 is electrically connected to the second load 92, and thus can receive a signal output from the second load 92. In the present embodiment, the control unit 15 is configured to not supply electric power to the second load 92 when the electric power path 80 is not in the low-voltage state, but supply electric power to the second load 92 upon receiving a request from the second load 92 even when the electric power path 80 is not in the low-voltage state.

The control unit 15 is electrically connected to each of the gates of the first switch unit 11, the second switch units 12A and 12B, and the third switch units 13A and 13B. The control unit 15 controls the first switch unit 11, the second switch units 12A and 12B, and the third switch units 13A and 13B to be in an on state by providing an on signal to the gates of the switch units, and controls the switch units to be in an off state by providing an off signal to the gates of the switch units. In the present embodiment, high level signals are on signals, and low level signals are off signals. The control unit 15 is electrically connected to the gate of the first switch unit 11 and a first input terminal 17A of the OR circuit 17 via a first output path 86. An output terminal 17C of the OR circuit 17 is electrically connected to the gates of the second switch units 12A and 12B. The control unit 15 applies an on signal or an off signal to the first output path 86, and thereby provides the on signal or the off signal to the first switch unit 11 and the second switch units 12A and 12B.

The control unit 15 is electrically connected to the charge/discharge unit 14. The control unit 15 performs charge control of charging the power storage unit 93 and discharge control of discharging the power storage unit 93. The charge control is control for charging the power storage unit 93 by causing the charge/discharge unit 14 to perform the charge operation while controlling the third switch units 13A and 13B to be in an on state. The discharge control is control for discharging the power storage unit 93 toward the first load 91 and the second load 92 by causing the charge/discharge unit 14 to perform the discharge operation while controlling the first switch unit 11 and the second switch units 12A and 12B to be in an on state. The control unit 15 starts the charge control when the start switch of a vehicle (not shown) is turned on, and ends the charge control when the output voltage of the power storage unit 93 reaches a voltage greater than or equal to the target voltage. After the charge control, the control unit 15 switches the third switch units 13A and 13B to be in an off state, and causes the charge/discharge unit 14 to perform the discharge operation. At this time, the first switch unit 11 and the second switch units 12A and 12B remain in the off state. Accordingly, a voltage based on the output voltage of the power storage unit 93 is applied to the second conductive path 82. The control unit 15 switches the first switch unit 11 and the second switch units 12A and 12B from this state to an on state, and thereby electric power can be instantly supplied to the first load 91 and the second load 92. Also, electric power can also be instantly supplied to the second load 92 when the second switch units 12A and 12B are switched to an on state by a latching circuit 30, which will be described later.

Configuration of Switch Control Circuit

Figure 2:
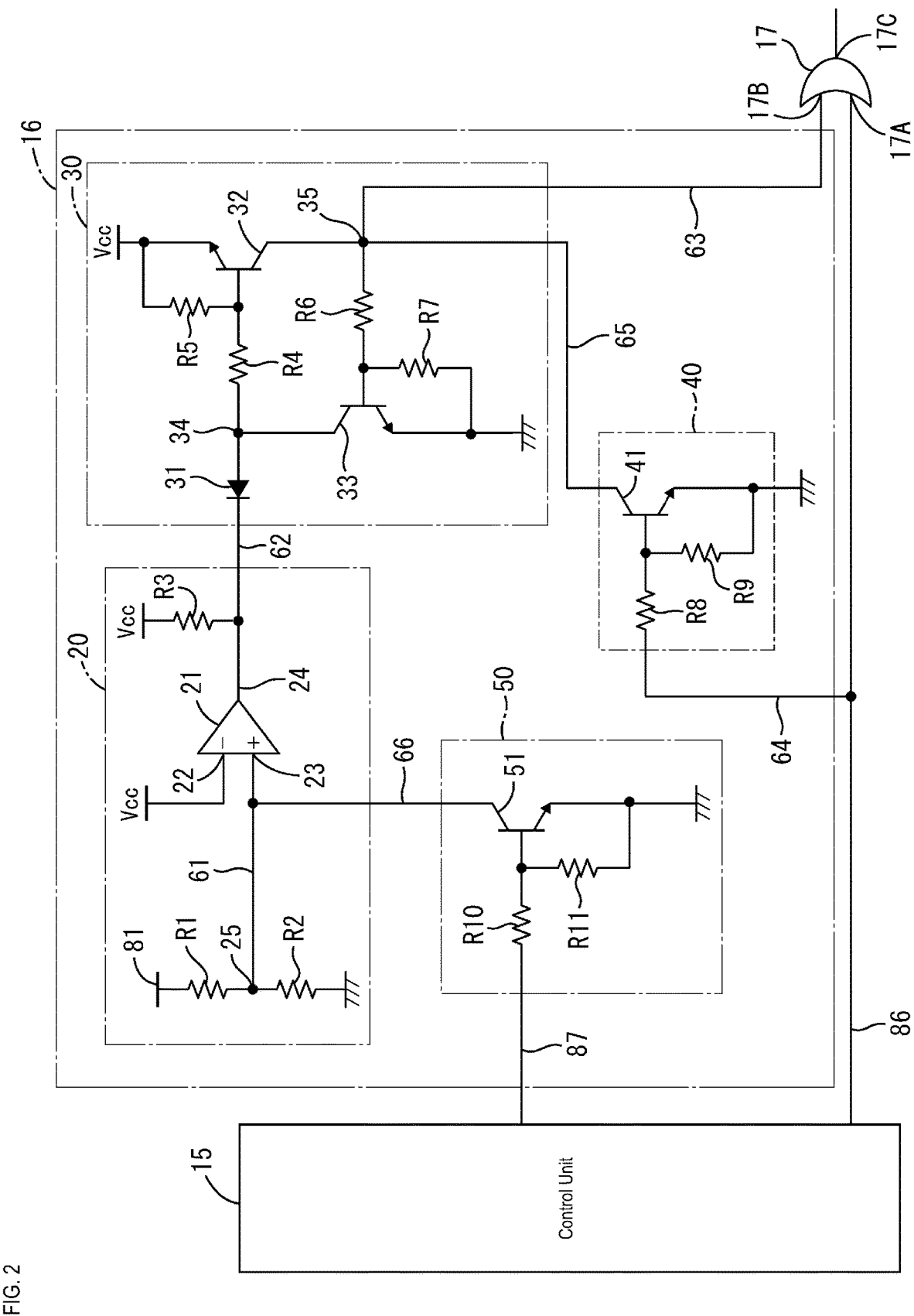
FIG. 2 is a circuit diagram schematically showing a configuration of a switch control circuit.

The switch control circuit 16 is a circuit that is different from the control unit 15, and controls the second switch units 12A and 12B. As shown in FIG. 2, the switch control circuit 16 includes a low-voltage detection circuit 20, a latching circuit 30, an unlatching circuit 40, and a failure check circuit 50.

The low-voltage detection circuit 20 is a circuit that detects the low-voltage state of the electric power path 80. The low-voltage detection circuit 20 determines that the electric power path 80 is not in the low-voltage state when the voltage of the first conductive path 81 is greater than the threshold value. The low-voltage detection circuit 20 determines that the electric power path 80 is in the low-voltage state when the voltage of the first conductive path 81 is less than or equal to the threshold value, and detects the low-voltage state. The low-voltage detection circuit 20 is electrically connected to the latching circuit 30 via a conductive path 62, and provides a low voltage detection signal to the latching circuit 30 upon detecting the low-voltage state of the electric power path 80.

The latching circuit 30 is a circuit that is switched to a latched state in which the second switch units 12A and 12B are kept in an on state when the low-voltage detection circuit 20 detects the low-voltage state of the electric power path 80. The latching circuit 30 is electrically connected to a second input terminal 17B of the OR circuit 17 via a conductive path 63. When the low voltage detection signal is received, the latching circuit 30 provides an on signal to the second input terminal 17B of the OR circuit 17 via the conductive path 63, and is switched to the latched state in which the second switch units 12A and 12B are kept in an on state.

The unlatching circuit 40 is a circuit that releases the latched state of the latching circuit 30. The unlatching circuit 40 is electrically connected to the control unit 15 via a conductive path 64, and is electrically connected to the latching circuit 30 via conductive path 65. When an unlatching instruction signal is received from the control unit 15, the unlatching circuit 40 releases the latched state of the latching circuit 30.

The failure check circuit 50 is a circuit for detecting a failure in the low-voltage detection circuit 20 and the latching circuit 30. The failure check circuit 50 is electrically connected to the control unit 15 via a second output path 87, and is electrically connected to the low-voltage detection circuit 20 via a conductive path 66. When a check instruction signal is received from the control unit 15, the failure check circuit 50 provides a low voltage signal to the low-voltage detection circuit 20 as a check signal. When the check signal is received, the low-voltage detection circuit 20 provides a low voltage detection signal to the latching circuit 30. When the low voltage detection signal is received, the latching circuit 30 provides the low voltage detection signal to the second input terminal 17B of the OR circuit 17. As a result, an on signal is provided from the OR circuit 17 to the second switch units 12A and 12B, and the second switch units 12A and 12B are switched to an on state.

The control unit 15 provides the check instruction signal to the failure check circuit 50, and determines that a failure has not occurred in the low-voltage detection circuit 20 and the latching circuit 30 when the second switch units 12A and 12B are in an on state. Conversely, when the second switch units 12A and 12B remain in the off state, the control unit 15 determines that a failure has occurred in the low-voltage detection circuit 20 or the latching circuit 30. The control unit 15 determines that the second switch units 12A and 12B are in an on state if, for example, a difference between the voltage values of the second switch units 12A and 12B is less than a predetermined value, and determines that the second switch units 12A and 12B are in an off state if the difference is greater than or equal to the predetermined value.

Detailed configurations of the low-voltage detection circuit 20, the latching circuit 30, the unlatching circuit 40, and the failure check circuit 50 will be described.

The low-voltage detection circuit 20 includes a comparator 21 and resistors R1, R2, and R3. An inverting input terminal 22 of the comparator 21 is electrically connected to a constant voltage supply Vcc. One end of the resistor R1 is electrically connected to the first conductive path 81, and the other end of the resistor R1 is electrically connected to one end of the resistor R2. The other end of the resistor R2 is electrically connected to the ground. A connection portion 25 where the other end of the resistor R1 and one end of the resistor R2 are connected is electrically connected to a non-inverting input terminal 23 of the comparator 21 via a conductive path 61. An output terminal 24 of the comparator 21 is electrically connected to the conductive path 62. One end of the resistor R3 is electrically connected to a constant voltage supply Vcc, and the other end of the resistor R3 is electrically connected to the conductive path 62.

The latching circuit 30 includes a diode 31, a PNP transistor 32, an NPN transistor 33, and resistors R4, R5, R6, and R7. The emitter of the PNP transistor 32 and one end of the resistor R5 are electrically connected to a constant voltage supply Vcc. The base of the PNP transistor 32 is electrically connected to one end of the resistor R4 and the other end of the resistor R5. The collector of the PNP transistor 32 is electrically connected to one end of the resistor R6 and the conductive path 63.

The other end of the resistor R6 is electrically connected to the base of the NPN transistor 33 and one end of the resistor R7. The other end of the resistor R7 and the emitter of the NPN transistor 33 are electrically connected to the ground. The collector of the NPN transistor 33 is electrically connected to a connection portion 34 where the other end of the resistor R4 and the anode of the diode 31 are connected. The cathode of the diode 31 is electrically connected to the conductive path 62.

The unlatching circuit 40 includes an NPN transistor 41 and resistors R8 and R9. One end of the resistor R8 is electrically connected to the conductive path 64. The other end of the resistor R8 is electrically connected to the base of the NPN transistor 41 and one end of the resistor R9. The other end of the resistor R9 and the emitter of the NPN transistor 41 are electrically connected to the ground. The collector of the NPN transistor 41 is electrically connected to a connection portion 35 of the latching circuit 30, the connection portion 35 being where the collector of the PNP transistor 32, one end of the resistor R6, and the conductive path 63 are connected. The conductive path 64 is electrically connected to the first output path 86. For this reason, an on signal or an off signal applied from the control unit 15 to the first output path 86 is provided to one end of the resistor R8 of the unlatching circuit 40 via the conductive path 64.

The failure check circuit 50 includes an NPN transistor 51 and resistors R10 and R11. One end of the resistor R10 is electrically connected to the second output path 87. The other end of the resistor R10 is electrically connected to the base of the NPN transistor 51 and one end of the resistor R11. The other end of the resistor R11 and the emitter of the NPN transistor 51 are electrically connected to the ground. The collector of the NPN transistor 51 is electrically connected to the conductive path 61 via the conductive path 66.

Next, the operation of the switch control circuit 16 will be described. The comparator 21 of the low-voltage detection circuit 20 outputs a high level signal from the output terminal 24 when the voltage of the first conductive path 81 is greater than a threshold value. At this time, in the diode 31 of the latching circuit 30, the anode-side voltage is lower than the cathode-side voltage, and thus electric current does not flow from the latching circuit 30 side to the low-voltage detection circuit 20 side. After that, if a disconnection or the like occurs in the electric power path 80, and the voltage of the first conductive path 81 decreases to a value less than or equal to the threshold value, the comparator 21 outputs a low level signal from the output terminal 24. In doing so, the anode-side voltage of the diode 31 increases to be higher than the cathode-side voltage, and thus electric current flows from the latching circuit 30 side to the low-voltage detection circuit 20 side. As a result, the PNP transistor 32 is switched from an off state to an on state, and an on signal is provided to the second input terminal 17B of the OR circuit 17 via the conductive path 63. Also, the on signal is provided to the gates of the second switch units 12A and 12B, and the second switch units 12A and 12B are switched to an on state.

Also, as a result of the PNP transistor 32 being switched to an on state, electric current flows from the base of the NPN transistor 33 to the emitter of the same, and the NPN transistor 33 is switched to an on state. Accordingly, electric current continues to flow from the emitter of the PNP transistor 32 to the base of the same, and the PNP transistor 32 is kept in the on state. Thus, the latching circuit 30 is switched to a latched state in which the second switch units 12A and 12B are kept in an on state.

When an on signal is provided from the control unit 15 to one end of the resistor R8 of the unlatching circuit 40 after the latching circuit 30 has been switched to the latched state, electric current flows from the base of the NPN transistor 41 to the emitter of the same, and the NPN transistor 41 is switched to an on state. As a result, the voltage of the connection portion 35 decreases, the NPN transistor 33 is switched to an off state, and the PNP transistor 32 is switched to an off state. Accordingly, the latched state of the latching circuit 30 is released. The second switch units 12A and 12B are kept in the on state due to the on signal provided from the control unit 15, which will be described later.

The failure check circuit 50 performs a failure check in the following manner. In the failure check circuit 50, when an on signal is provided from the control unit 15 to one end of the resistor R10, electric current flows from the base of the NPN transistor 51 to the emitter of the same, and the NPN transistor 51 is switched to an on state. As a result, the voltage input to the non-inverting input terminal 23 of the comparator 21 of the low-voltage detection circuit 20 reaches a value less than or equal to a threshold value. Then, a low level signal is output from the output terminal 24 of the comparator 21, the latching circuit 30 is switched to a latched state, and the second switch units 12A and 12B are switched to an on state. The control unit 15 determines, based on the voltages of the second switch units 12A and 12B, whether or not the second switch units 12A and 12B are in an on state, and determines whether or not a failure has occurred in the low-voltage detection circuit 20 and the latching circuit 30.

Operation of In-Vehicle Backup Control Apparatus

Figure 3:
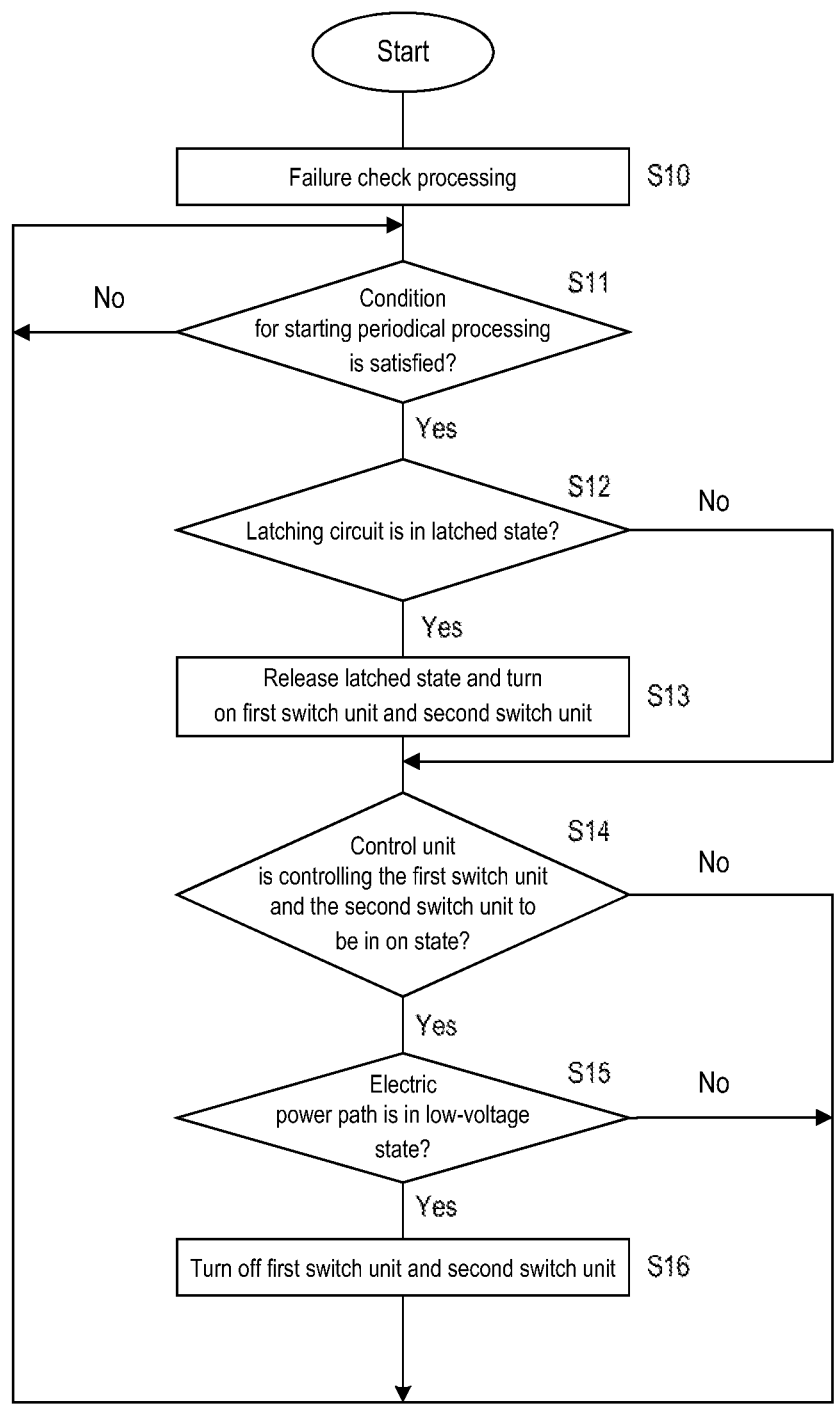
FIG. 3 is a flowchart illustrating a flow of backup processing performed by a control unit.

FIG. 3 shows an example of backup processing performed by the control unit 15. The control unit 15 starts the backup processing when a condition for starting the backup processing is satisfied. The condition for starting the backup processing may be, for example, that the start switch (for example, ignition switch) (not shown) is turned on. For example, when a start signal indicating that the start switch has been turned on is received from an external ECU (Electronic Control Unit), the control unit 15 can recognize that the start switch has been turned on.

When the backup processing is started, the control unit 15 performs failure check processing (step S10). Also, although not shown in FIG. 3, when the start switch is turned on, the control unit 15 starts charge control. When the output voltage of the power storage unit 93 reaches a value greater than or equal to the target voltage, the control unit 15 ends the charge control. It is preferable that the control unit 15 performs the failure check processing before the charge control is started or in parallel to the charge control. Also, although not shown in FIG. 3, the control unit 15 causes the charge/discharge unit 14 to start the discharge operation after the charge control. As a result, a voltage based on the output voltage from the power storage unit 93 is applied to the second conductive path 82.

In the failure check processing, the control unit 15 provides an on signal to the failure check circuit 50 via the second output path 87 as the check instruction signal. Then, the control unit 15 determines whether or not the second switch units 12A and 12B are in an on state. As a result, if it is determined that the second switch units 12A and 12B are in an on state, the control unit 15 determines that a failure has not occurred in the low-voltage detection circuit 20 and the latching circuit 30. If it is determined that the second switch units 12A and 12B are in an off state, the control unit 15 determines that a failure has occurred in the low-voltage detection circuit 20 or the latching circuit 30. If it is determined that a failure has occurred, the control unit 15 performs failure processing. The failure processing may be, for example, processing for providing a notification indicating that a failure has occurred from a notification unit (not shown), processing for notifying an external apparatus of the fact that a failure has occurred, or the like.

After the failure check processing, the control unit 15 determines whether or not a condition for starting periodical processing that is periodically performed is satisfied (step S11). The condition for starting periodical processing may be, for example, that the periodical processing is the processing that is performed first after the start switch is turned on, that a predetermined length of time has passed after the previous periodical processing was started, that a predetermined length of time has passed after the previous periodical processing was ended, or the like.

If it is determined that the condition for starting periodical processing is not satisfied (No in step S11), the control unit 15 returns to the processing in step S11. That is, the control unit 15 is in a standby state until the condition for starting periodical processing is satisfied. If it is determined that the condition for starting periodical processing is satisfied (Yes in step S11), the control unit 15 determines whether or not the latching circuit 30 is in the latched state (step S12). If it is determined that the latching circuit 30 is in the latched state (Yes in step S12), the control unit 15 determines that the electric power path 80 is in the low-voltage state, releases the latched state, and provides an on single to the first switch unit 11 and the second switch units 12A and 12B. In the present embodiment, the control unit 15 applies an on signal to the first output path 86, and thereby providing the on signal to the first switch unit 11 and the second switch units 12A and 12B and also providing the on signal to the unlatching circuit 40. Accordingly, the latched state of the latching circuit 30 is released, and the first switch unit 11 and the second switch units 12A and 12B are switched to an on state.

After step S13, or if it is determined that the latching circuit 30 is not in the latched state (No in step S12), the control unit 15 determines whether or not the control unit 15 is controlling the first switch unit 11 and the second switch units 12A and 12B to be in an on state (step S14). That is, the control unit 15 determines whether or not the control unit 15 is outputting an on signal from the first output path 86. If it is determined that the control unit 15 is controlling the first switch unit 11 and the second switch units 12A and 12B to be in an on state (Yes in step S14), the control unit 15 determines whether or not the electric power path 80 is in the low-voltage state (step S15). If the voltage of the first conductive path 81 based on a signal from the voltage detection unit 18A is greater than a threshold value, the control unit 15 determines that the electric power path 80 is not in the low-voltage state. Conversely, when the voltage of the first conductive path 81 based on the signal from the voltage detection unit 18A is less than or equal to the threshold value, the control unit 15 determines that the electric power path 80 is in the low-voltage state. If it is determined that the electric power path 80 is not in the low-voltage state (No in step S15), the control unit 15 outputs an off signal from the first output path 86, and controls the first switch unit 11 and the second switch units 12A and 12B to be in an off state (step S16). Accordingly, if the electric power path 80 is temporarily in the low-voltage state, the supply of backup power can be stopped when the electric power path 80 exits from the low-voltage state.

After step S16, if No is determined in step S14, or Yes is determined in step S15, the control unit 15 returns to the processing in step S11. Then, the control unit 15 repeatedly performs the periodical processing.

Next, an example of advantageous effects of the configuration of the present disclosure will be described.

An in-vehicle backup the control apparatus 1 according to the present disclosure performs a backup operation of supplying electric power from a power storage unit 93 to a first load 91 and a second load 92 when an electric power path 80, through which electric power from a power supply unit 90 is supplied, is in a low-voltage state in an in-vehicle power supply system 100. The control apparatus 1 includes a first switch unit 11, second switch units 12A and 12B, a control unit 15, a low-voltage detection circuit 20, and a latching circuit 30. The first switch unit 11 is disposed between the power storage unit 93 and the first load 91. The second switch units 12A and 12B are disposed between the power storage unit 93 and the second load 92. The control unit 15 controls the first switch unit 11 and the second switch units 12A and 12B. The low-voltage detection circuit 20 detects the low-voltage state of the electric power path 80 through which electric power from the power supply unit 90 is supplied. When the low-voltage detection circuit 20 detects the low-voltage state, the latching circuit 30 is switched to a latched state in which the second switch units 12A and 12B are kept in an on state. When the electric power path 80 is in the low-voltage state, the control unit 15 releases the latched state and controls the first switch unit 11 and the second switch units 12A and 12B to be in an on state.

With this configuration, when the electric power path 80 is in the low-voltage state, the latching circuit 30 can be instantly switched to the latched state to switch the second switch units 12A and 12B to be in an on state and supply electric power to the second load 92. Accordingly, electric power can be instantly supplied to the second load 92, without having to wait for the first switch unit 11 and the second switch units 12A and 12B to be in an on state by the control unit 15 performing the periodical processing. In addition, when the electric power path 80 is in the low-voltage state, the control unit 15 releases the latched state of the latching circuit 30, and controls the first switch unit 11 and the second switch units 12A and 12B to be in an on state. Accordingly, the function of controlling the second switch units 12A and 12B to be in an on state can be transferred from the latching circuit 30 to the control unit 15, and thus the control unit 15 can collectively perform operations including the control operation of keeping the first switch unit 11 and the second switch units 12A and 12B in an on state.

Also, when the electric power path 80 is not in the low-voltage state, the control unit 15 releases the latched state, and controls the second switch units 12A and 12B to be in an off state. With this configuration, even when the latching circuit 30 is switched to the latched state due to an operational error or due to the electric power path 80 being temporarily in the low-voltage state, the control unit 15 can release the latched state and return the second switch units 12A and 12B back to an off state.

Furthermore, the low-voltage detection circuit 20 is configured to receive an input of a low voltage signal when the electric power path 80 is in the low-voltage state. The control apparatus 1 includes a failure check circuit 50 that provides the low voltage signal to the low-voltage detection circuit 20 as a check signal. The control unit 15 causes the failure check circuit 50 to perform an operation of providing the check signal to the low-voltage detection circuit 20, and performs failure check processing of determining whether or not the latching circuit 30 is in the latched state.

With this configuration, it is possible to check whether or not the low-voltage detection circuit 20 and the latching circuit 30 normally operate.

Furthermore, the control apparatus 1 further includes a charge/discharge unit 14 that performs a charge operation of charging the power storage unit 93. The control unit 15 performs charge control of causing the charge/discharge unit 14 to perform the charge operation until the charge voltage of the power storage unit 93 reaches a target voltage when a vehicle starts operating. The control unit 15 performs the failure check processing before the charge control is started after the vehicle starts operating, or in parallel to the charge control.

With this configuration, the failure check processing can be performed rapidly after the vehicle starts operating.

Other Embodiments

The present disclosure is not limited to the embodiment described in the foregoing and the drawings. For example, the features of the embodiments described above and below can be combined in any way as long as the combination is not contradictory. Also, any of the features of the embodiments described above and below can be omitted unless it is clearly stated that they are essential. Furthermore, the embodiment described above may be changed as described below.

In the first embodiment given above, the power supply unit is a lead battery, but the power supply unit is not limited to a lead battery. The power supply unit may be, for example, a lithium ion battery, an alternator, a converter, or the like.

In the first embodiment given above, the power storage unit is an electric double-layer capacitor, but the power storage unit is not limited to an electric double-layer capacitor. The power storage unit may be, for example, a lithium ion capacitor, a lead battery, a lithium ion battery, or the like.

In the first embodiment given above, the charge/discharge unit is a DC/DC converter, but may be a switching device such as a FET. Also, the in-vehicle backup control apparatus may be configured without a charge/discharge unit.

In the first embodiment given above, as the method for controlling the second switch unit to be in an off state by releasing the latched state when the electric power path is not in the low-voltage state, the configuration is used in which the control unit determines whether or not the electric power path is in the low-voltage state after releasing the latched state, and controls the second switch unit to be in an off state if it is determined that the electric power path is not in the low-voltage state. However, a configuration may be used in which the control unit releases the latched state after it is determined that the electric power path is in the low-voltage state, and controls the second switch unit to be in an off state.

In the first embodiment given above, the control unit is configured to release the latched state when controlling the first switch unit and the second switch unit to be in an on state, but the control unit does not necessarily need to release the latched state. That is, the control unit may be configured to control the first switch unit and the second switch unit to be in an on state while keeping the latched state of the latching circuit.

In the first embodiment given above, the control unit is composed mainly of a microcomputer, but may be implemented using a plurality of hardware circuits other than the microcomputer.

The embodiments disclosed herein should be considered illustrative in all aspects and not restrictive. The scope of the present disclosure is not limited to the embodiments disclosed herein, and all changes that come within the scope indicated by the appended claims or the scope of equivalency of the appended claims are intended to be embraced within the scope of the present disclosure.

What is claimed is:

1. An in-vehicle backup control apparatus to be used in an in-vehicle power supply system including a power supply unit, a power storage unit, and a load, the in-vehicle backup control apparatus being configured to perform a backup operation of supplying electric power from the power storage unit to the load when an electric power path through which electric power from the power supply unit is supplied is in a low-voltage state, the in-vehicle backup control apparatus comprising:
   a switch unit disposed between the power storage unit and the load;
   a control unit that controls the switch unit;
   a low-voltage detection circuit that detects the low-voltage state; and
   a latching circuit that is switched to a latched state in which the switch unit is kept in an on state when the low-voltage detection circuit detects the low-voltage state,
   wherein the control unit controls the switch unit to be in the on state when the electric power path is in the low-voltage state; and
   wherein the low-voltage detection circuit is configured to receive an input of a low voltage signal when the electric power path is in the low-voltage state,
   the in-vehicle backup control apparatus comprises a failure check circuit that provides the low voltage signal to the low-voltage detection circuit as a check signal, and
   the control unit causes the failure check circuit to perform an operation of providing the check signal to the low-voltage detection circuit, and performs failure check processing of determining whether or not the latching circuit is in the latched state.

2. The in-vehicle backup control apparatus according to claim 1, wherein the control unit releases the latched state and controls the switch unit to be in an off state when the electric power path is not in the low-voltage state.

3. The in-vehicle backup control apparatus according to claim 1, further comprising:
   a charge unit that performs a charge operation of charging the power storage unit,
   wherein the control unit performs charge control of causing the charge unit to perform the charge operation until the charge voltage of the power storage unit reaches a target voltage when a vehicle starts operating, and performs the failure check processing before the charge control is started after the vehicle starts operating, or in parallel to the charge control.

* * * * *